United States Patent [19]

Benda et al.

[11] Patent Number: 6,007,764
[45] Date of Patent: Dec. 28, 1999

[54] ABSORPTION TAILORED LASER SINTERING

[75] Inventors: John A. Benda, Amston; Aristotle Parasco, East Hampton, both of Conn.

[73] Assignee: United Technologies Corporation, Hartford, Conn.

[21] Appl. No.: 09/049,408

[22] Filed: Mar. 27, 1998

[51] Int. Cl.[6] .............................. B22F 3/10; B22F 7/02; B29C 69/02; B29C 71/04
[52] U.S. Cl. .................................. 419/7; 419/36; 419/37; 264/497
[58] Field of Search .................................. 419/7, 36, 37; 264/497

[56] References Cited

U.S. PATENT DOCUMENTS

| | | | |
|---|---|---|---|
| 4,863,538 | 9/1989 | Deckard | 156/62.2 |
| 4,944,817 | 7/1990 | Bourell et al. | 156/62.2 |
| 5,017,753 | 5/1991 | Deckard | 219/121.63 |
| 5,147,587 | 9/1992 | Marcus et al. | 264/22 |
| 5,155,321 | 10/1992 | Grube et al. | 219/121.6 |
| 5,155,324 | 10/1992 | Deckard et al. | 219/121.64 |
| 5,156,697 | 10/1992 | Bourell et al. | 156/62.2 |
| 5,182,170 | 1/1993 | Marcus et al. | 428/551 |
| 5,286,573 | 2/1994 | Prinz et al. | 428/457 |
| 5,342,919 | 8/1994 | Dickens, Jr. et al. | 528/323 |
| 5,352,405 | 10/1994 | Beaman et al. | 419/45 |
| 5,393,482 | 2/1995 | Benda et al. | 419/1 |
| 5,427,733 | 6/1995 | Benda et al. | 419/1 |
| 5,431,967 | 7/1995 | Manthiram et al. | 427/555 |
| 5,508,489 | 4/1996 | Benda et al. | 219/121.76 |
| 5,530,221 | 6/1996 | Benda et al. | 219/121.83 |

OTHER PUBLICATIONS

Benda, J. A., "Temperature-Controlled Selective Laser Sintering", Proceedings of the Solid Freeform Fabrication Symposium, (pp. 277–284), The University of Texas at Austin, Aug. 8–10, 1994.

Forderhase, et al., "SLS™ Prototypes from Nylon", Proceedings of the Solid Freeform Fabrication Symposium, (pp. 102–109), The University of Texas at Austin, Aug. 8–10, 1994.

Das, et al., "Design of a High Temperature Workstation for the Selective Laser Sintering Process", Proceedings of the Solid Freeform Fabrication Symposium, The University of Texas at Austin, Aug. 12–14, 1991.

Nutt, K. "The Selective Laser Sintering Process," *Photonics Spectra*, Sep. 1991, pp. 102–104.

Prof. J. P. Kruth et al., "Material Incress Manufacturing by Rapid Prototyping Techniques", CIRP Annals 1991 Manufacturing Technology, vol. 40/2/1991, pp. 603–614.

*Primary Examiner*—Daniel J. Jenkins
*Attorney, Agent, or Firm*—Brian D. Lefort

[57] ABSTRACT

The present invention is a method which customizes the penetration depth of a heat-fusible powder used in solid freeform fabrication process such as laser sintering. The penetration depth of the heat-fusible powder is customized by combining opaque and transparent powders at a ratio which ensures that the beam contacts a portion of powder beneath its surface, thereby promoting complete layer sintering as well as adherence to previously sintered layers.

9 Claims, 1 Drawing Sheet

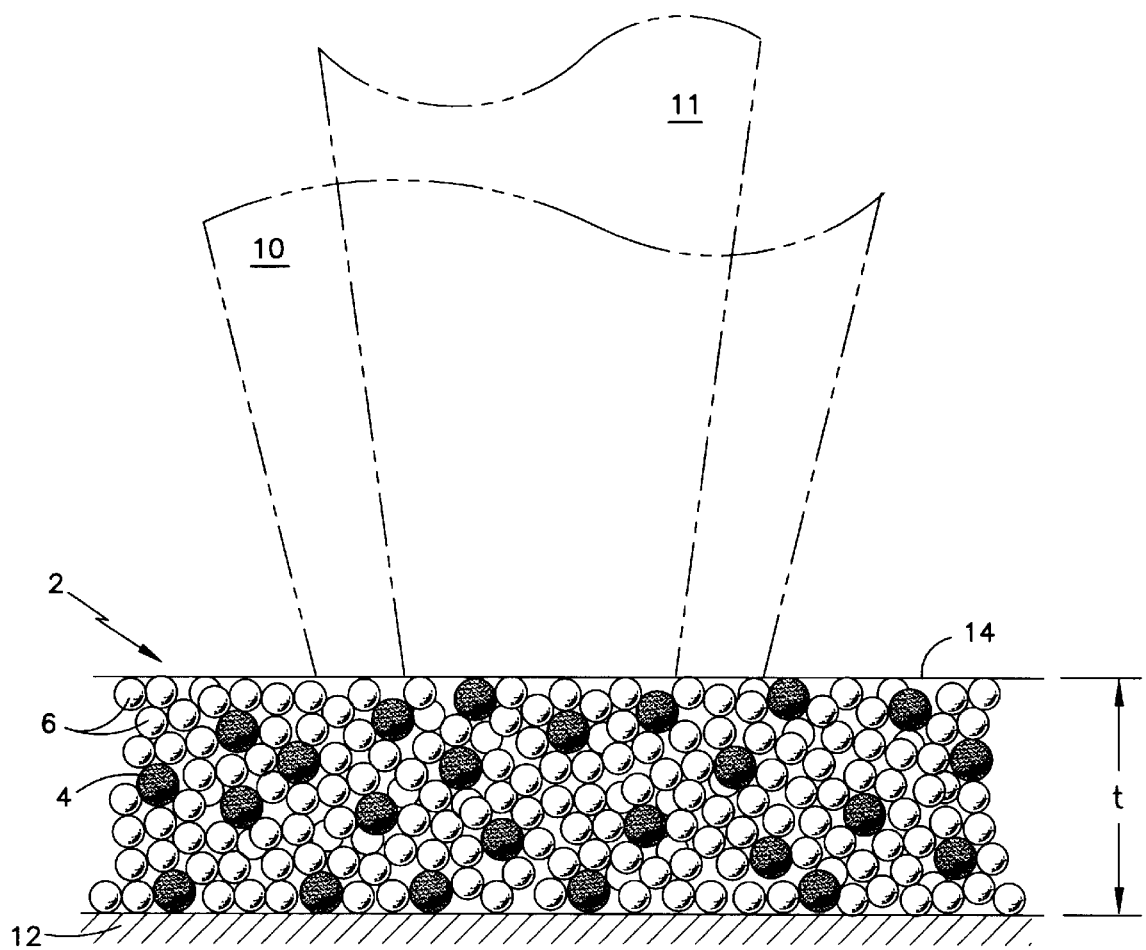

ABSORPTION TAILORED LASER SINTERING

TECHNICAL FIELD

This invention relates to laser sintering and more particularly, to a method which customizes the penetration depth of a heat-fusible powder layer.

BACKGROUND ART

Selective laser sintering is a solid freeform fabrication process which, in a layer-by-layer fashion, creates parts with precise dimensions requiring minimal, if any, machining. More specifically, the selective laser sintering process usually includes a laser directing a beam of electromagnetic radiation at a heat-fusible powder (hereinafter referred to as powder) causing the portion of powder struck by the beam to sinter. The beam scans back and forth across the powder and forms a sintered layer corresponding to a cross sectional portion of the part. When one layer is completely sintered, the laser is turned off, the sintered layer is lowered, a new layer of powder is spread over the previous, now sintered layer, and the new layer of powder is scanned by the beam. Scanning the new layer not only sinters the new layer but also causes the newly sintered layer to adhere to the previously sintered layer.

One problem with selective laser sintering, however, is that the beam often cannot penetrate the powder surface which inevitably sinters before the powder beneath the surface (hereinafter referred to as sub-surface powder) sinters. Consequently, the sub-surface powder must rely on thermal conductivity to adequately raise its temperature to the sintering level. When thermal conduction fails to transfer sufficient energy from the surface to the sub-surface powder, the sub-surface powder fails to sinter and adhere to the previously sintered layer.

The goal of sintering is to fuse particles while maintaining their integrity and exploiting their mechanical properties. For ceramic particles, it is important that the ceramic particles sinter without melting in order to prevent the destruction of the integrity of the particles. One attempt to ensure complete sintering of ceramic particles comprised continued contact by the beam on the powder surface, post sintering thereof, with the expectation that the excess energy would transfer to and sinter the sub-surface powder. This method failed to transfer sufficient energy to and sinter the sub-surface powder. Rather than sintering the sub-surface powder, the excess energy melted the powder surface, thereby adversely effecting the mechanical properties of the ceramic powder.

Sintering the sub-surface powder requires careful control of the powder temperature throughout the depth of the powder. Various methods of controlling the powder temperature have been employed. For example, U.S. Pat. No. 5,017,753, issued May 21, 1991, indicates that creating a downward flow of temperature-controlled air through the powder layer moderates the temperature differences within the powder layer. U.S. Pat. No. 5,352,405, issued Oct. 4, 1994, recognized that beam overlap of previously scanned regions created thermal inequities within these regions and attempted to dissipate these inequities by reducing the exposure time of the beam to the overlapping regions. U.S. Pat. No. 5,427,733, issued Jun. 27, 1995, addressed the problem of uneven sintering created from constant powered lasers by altering the beam intensity. The prior art, however, fails to teach a method for successfully sintering substantially all of a powder layer.

Thus, it would be desirable to devise a sintering process which sinters substantially all of the powder layer.

DISCLOSURE OF INVENTION

The present invention customizes the penetration depth of a powder layer to allow a beam to contact a portion of sub-surface powder. Contacting a portion of sub-surface powder enables the beam to sinter a portion of sub-surface powder without melting or over-sintering the surface, thereby enhancing the sintering of substantially all of the powder layer.

Accordingly, the present invention relates to a method to customize the penetration depth of a powder layer, which includes the operative steps of: (a) selecting a first powder having a plurality of opaque particles which inhibit transmission of electromagnetic radiation at a wavelength, the opaque particles having an opaque particle diameter; (b) selecting a second powder having a plurality of transparent particles which transmit electromagnetic radiation at the wavelength; and (c) combining the first powder and the second powder at a ratio to form a powder layer which when contacted by an energy beam, consisting of electromagnetic radiation having the wavelength, has a penetration depth greater than the opaque particle diameter.

The foregoing features and advantages of the present invention will become more apparent in light of the following detailed description of exemplary embodiments thereof as illustrated in the accompanying drawings.

BRIEF DESCRIPTION OF DRAWINGS

The FIG. 1 is a cross section of a laser contacting a heat-fusible powder consisting of opaque and transparent particles.

BEST MODE FOR CARRYING OUT THE INVENTION

The present invention customizes the penetration depth of a powder layer. Customization comprises utilizing a mixture of opaque and transparent powders and a laser which emits electromagnetic radiation in the form of an energy beam having a specific wavelength and sufficient intensity to penetrate a powder layer at a desired depth. Customizing the penetration depth of the powder layer ensures direct energy beam contact with sub-surface powder, thereby advancing sintering of a portion of sub-surface powder. Through continued direct contact with the energy beam and/or due to thermal conductivity, substantially all of the powder layer sinters and effectively bonds to the previously sintered layer.

The penetration depth is a function of the beam wavelength, the type of laser and the amount and type of powders in the powder layer. The preferred laser is chosen based upon the necessary wavelength to obtain the desired penetration depth ($\lambda$) for a given powder layer. The wavelength of a beam varies with the type of laser, which usually produces one wavelength or a few discrete wavelengths within a narrow wavelength range. For example, a $CO_2$ laser emits an energy beam having a wavelength of about 10.6 $\mu$m and a neodymium yttrium-aluminum-garnet (Nd:YAG) laser emits an energy beam having a wavelength of about 1.06 $\mu$m, while an argon laser emits an energy beam having a wavelength of about 0.458 $\mu$m to about 0.528 $\mu$m with its most intense energy beams in the wavelength range of about 0.488 $\mu$m to about 0.514 $\mu$m.

The preferred laser must also emit sufficient electromagnetic radiation at the necessary wavelength to sinter the powder layer at the penetration depth (λ). The amount of electromagnetic radiation within a beam, its power, corresponds to the amount of electromagnetic radiation per unit time. Upon being contacted by the beam at the desired penetration depth, its temperature increases, thereby causing the powder layer to sinter. Once the layer portion contacted by the energy beam sinters, the thermal conductivity of the powder transfers energy to the remainder of the powder layer, thereby increasing the temperature of and promoting sintering of the remaining powder layer.

The powder layer consists of a mixture of opaque and transparent powders, each having a plurality of particles. The opaque and transparent powders combine at a ratio which creates a penetration depth which is at least greater than the particle size of an opaque particle. At a specific wavelength, a particle absorbs, reflects and/or transmits electromagnetic radiation. A particle which inhibits (i.e., does not transmit) electromagnetic radiation at a specific wavelength is referred to as an opaque particle. A particle which transmits (i.e., permits passage) electromagnetic radiation at a specific wavelength is referred to as a transparent particle. No particle, however, is perfectly transparent because even transparent particles absorb some electromagnetic radiation incident on the transparent particle, and the transmissivity of transparent particle is dependent upon the particular wavelength. For example, silica ($SiO_2$) particles transmit electromagnetic radiation having a wavelength from about 0.2 μm to about 4.0 μm but absorb or reflect substantially all electromagnetic radiation having a wavelength outside this range. The transmission range of other ceramic particles varies but the inventors of the present invention have discovered that zircon ceramic particles absorb a beam having at least one wavelength within the wavelength range of about 0.458 μm to about 0.528 μm. Tungsten, like most other metals, absorb or reflect substantially all electromagnetic radiation at substantially all wavelengths. Preferred powders are chosen based upon their transmissivity at a given wavelength as well as the desired mechanical properties such as tensile strength, modulus of elasticity, hardness, thermal coefficient of expansion, etc. Possible powders include: metal powders, polymeric powders such as nylon, polycarbonate, paraffin (i.e., wax), ceramic powders, and others.

The ratio of opaque and transparent particles in the powder layer corresponds to the desired penetration depth (λ) and is dependent upon the wavelength of the energy beam. The preferred penetration depth of a powder layer being used as a base layer of a part is a depth sufficient to sinter substantially all of the powder layer, while the preferred penetration depth of a powder layer being applied over a previously sintered layer is a depth sufficient to sinter substantially all of the powder layer and adhere the powder layer to the previously sintered layer. In order to ensure that the beam penetrates the surface of a layer, a penetration depth (λ), which is at least greater than the size of an opaque particle, is preferred because having such a penetration depth directly increases the temperature of and promotes sintering of the sub-surface powder and adherence to the previously sintered layer. As the penetration depth approaches the thickness (t) of the powder layer, the likelihood of sintering sub-surface powder adjacent to the previously sintered layer increases, thereby further promoting adherence thereto. The penetration depth (λ) preferably ranges from greater than the diameter (d) of an opaque particle to about the layer thickness (t), with a penetration depth (λ) approximately equal to the layer thickness (t) especially preferred. The penetration depth (λ) can also be greater than the layer thickness (t).

The penetration depth (λ) is inversely related to the absorption coefficient (α) as is expressed according to following equation:

$$\lambda = \frac{1}{\alpha} \quad \text{[Eq. 1]}$$

The absorption coefficient (α) is the ratio of energy absorbed by a material at a given depth to the energy incident on the surface of the material. Altering the absorption coefficient (α), therefore, alters the penetration depth (λ) of the powder layer. More specifically, increasing the absorption coefficient (α) decreases the penetration depth (λ) while decreasing the absorption coefficient (α) increases the penetration depth (λ). The present invention customizes the penetration depth (λ) of the powder layer by altering its absorption coefficient (α).

Assuming all particles within the powder layer are substantially spherical and equivalently sized, the absorption coefficient (α) of the powder layer can be expressed according to the following formula:

$$\alpha = \frac{3f\delta}{2d} \quad \text{[Eq. 2]}$$

where, d=particle diameter

δ=packing fraction f=fraction of opaque particles

Eq. 2 also establishes a useful baseline to estimate the absorption coefficient (α) of a powder layer having unequally sized non-spherical particles. As mentioned previously, the absorption coefficient (α) is inversely related to the penetration depth (λ). Replacing the absorption coefficient (α) of Eq. 1 with its factorial equivalent in Eq. 2, allows the penetration depth (λ) to be expressed according to the following formula:

$$\lambda = \frac{2d}{3f\delta} \quad \text{[Eq. 3]}$$

The penetration depth (λ) of a powder layer is, therefore, a function of three variables: (1) the particle diameter (d); (2) the fraction of opaque particles (f); and (3) the packing fraction (δ). The packing fraction (δ) is the percentage of volume occupied by particles. The fraction of opaque particles (f) is the number of opaque particles ($N_o$) as compared to the total number of particles ($N_p$) for a given volume. The total number of particles ($N_p$) includes the sum of opaque particles ($N_o$) and transparent particles ($N_t$). The fraction of opaque particles (f) can, therefore, be expressed according to the following formula:

$$f = \frac{N_o}{[N_o + N_t]} \quad \text{[Eq. 4]}$$

Replacing the fraction of opaque particles (f) in Eq. 3 with its factorial equivalent in Eq. 4 allows the penetration depth (λ) to be expressed according to the following formula:

$$\lambda = \frac{2d}{3\delta}\left[\frac{N_o + N_t}{N_o}\right] \quad [\text{Eq. 5}]$$

FIG. 5 can also be expressed according to the following formula:

$$\lambda = \frac{2d\left(1 + \frac{N_t}{N_o}\right)}{3\delta} \quad [\text{Eq. 6}]$$

Varying the number of opaque particles ($N_o$) and the number of transparent particles ($N_t$) while maintaining a constant particle diameter (d) and a constant packing fraction ($\delta$) changes the penetration depth ($\lambda$). The present invention customizes the penetration depth ($\lambda$) of a powder by selecting a ratio of transparent particles to opaque particles thereby allowing an energy beam to contact a portion of sub-surface powder. Similarly, if certain mechanical properties of the powder layer are required, the penetration depth ($\lambda$) can also be customized by changing either the particle diameter (d), the packing fraction ($\delta$) or both.

For example, in FIG. 1, a powder layer (2) consisted of tungsten (opaque) particles (4) having a particle diameter (d) of about 50 µm and silica (transparent) particles (6) having a particle diameter (d) of about 30 µm. The powder layer (2) had a packing fraction ($\delta$) of about 0.2 and a layer thickness (t) of about 125 µm, which is the typical layer thickness (t) in a selective laser sintering process.

Although one laser having sufficient power is sufficient to sinter the powder layer (2), two lasers were used. Using one laser to locally heat (i.e., preheat) the portion of the powder layer which the other laser will sinter, minimizes the possibility that the sintered portion will curl. Therefore, a fifty watt carbon dioxide ($CO_2$) laser emitted about a twenty watt beam (10), having a diameter of about 3 mm and consisting of electromagnetic radiation having a wavelength of about 10.6 µm, and locally heated the powder layer (2). A seven watt argon laser emitted a beam (11), having a diameter of about 70 µm to about 80 µm and consisting of electromagnetic radiation having a wavelength of about 0.488 to 0.514 µm, and sintered the powder layer (2). The preferred penetration depth ($\lambda$) was about 125 µm which was also the layer thickness (t). In order to produce a penetration depth equal to about 125 µm, the ratio of silica (transparent) particles (6) to tungsten (opaque) particles (4) was about four.

The lasers directed the beams (10), (11) toward the powder layer (2), scanned back and forth as well as across the powder layer (2), and contacted and sintered the powder layer (2) at a depth greater than the tungsten particle diameter. A substantial portion of the powder layer (2) beneath the surface (14) sintered.

A new powder layer, having the same characteristics as the previous powder layer, was then spread over the previously now sintered layer (12). The lasers, again, directed the beams (10), (11) toward the new powder layer and sintered the new powder layer, which adhered to the previously now sintered layer (12). Subsequent new powder layers were spread over the previously sintered lasers and sintered until the predetermined size of the part was formed. Although the silica particles (6) and the tungsten particles (4) were not identically sized spherical particles, the argon beam (11) penetrated the surface (14) of the powder layer (2) and sintered a portion of the sub-surface powder, thereby promoting adherence to the previously now sintered layer (12).

The present invention enables substantially complete sintering of a powder layer via adjustment of the layer's penetration depth. In contrast, the prior art unsuccessfully attempted to sinter sub-surface powder by relying upon techniques such as thermal conduction and adjusting energy beam intensity, among others. The delamination of multiple layers, reduced structural integrity within each layer, and other problems commonly encountered in the prior art due to an inability to sinter substantially all of the powder layer, have been significantly reduced, if not wholly eliminated by the present invention. Customizing the opaque to transparent particle ratio in conjunction with the type of laser (intensity and wavelength) has enabled penetration of the surface and sintering of sub-surface powder leading to the production of superior parts.

Although this invention has been shown and described with respect to detailed embodiments thereof, it will be understood by those skilled in the art that various changes in form and detail thereof may be made without departing from the spirit and scope of the claimed invention.

We claim:

1. A method to customize the penetration depth of a powder layer comprising, the steps of:
   (a) selecting a first powder having a plurality of opaque particles which inhibit transmission of electromagnetic radiation at a wavelength, said opaque particles having a diameter;
   (b) selecting a second powder having a plurality of transparent particles which transmit electromagnetic radiation at said wavelength; and
   (c) combining said first powder and said second powder at a ratio to form a first powder layer which when contacted by an energy beam, consisting of electromagnetic radiation having said wavelength, has a penetration depth greater than said opaque particle diameter.

2. The method of claim 1 further comprising:
   directing said energy beam toward said first powder layer wherein said energy beam penetrates said first powder layer to said penetration depth.

3. The method of claim 2 further comprising:
   sintering at least a portion of said first powder layer at said penetration depth.

4. The method of claim 3 further comprising:
   forming a second powder layer comprising of said first powder and said second powder, over said first powder layer, said second powder having said penetration depth;
   directing said energy beam toward said second powder layer wherein said energy beam penetrates said second powder layer to said penetration depth; and
   sintering at least a portion of said second powder layer such that said second powder layer adheres to said first powder layer.

5. The method of claim 1 wherein said first powder layer has a layer thickness and said penetration depth is equal to said layer thickness.

6. The method of claim 1 wherein said first powder layer has a layer thickness and said penetration depth is greater than said layer thickness.

7. A method to customize the penetration depth of a powder layer, comprising the steps of:
   (a) selecting a first powder having a plurality of opaque particles which inhibit transmission of electromagnetic radiation at a wavelength, said opaque particles having a diameter;

(b) selecting a second powder having a plurality of transparent particles which transmit electromagnetic radiation at said wavelength;

(c) combining said first powder and said second powder to form a first powder layer, said first powder layer having a thickness, said first powder and said second powder combined at a ratio which when contacted by an energy beam consisting of electromagnetic radiation having said wavelength has a penetration depth equal to said thickness;

(d) directing said energy beam toward said first powder layer wherein said energy beam penetrates said first powder layer to said penetration depth; and (e) sintering at least a portion of said first powder and said second powder within said first powder layer.

8. A sintered part formed by the process comprising the steps of:

(a) selecting a first powder having a plurality of opaque particles which inhibit transmission of electromagnetic radiation at a wavelength, said opaque particles having a diameter;

(b) selecting a second powder having a plurality of transparent particles which transmit electromagnetic radiation at said wavelength;

(c) combining said first powder and said second powder at a ratio to form a powder layer which when contacted by an energy beam, consisting of electromagnetic radiation having said wavelength, has a penetration depth greater than said opaque particle diameter;

(d) directing said energy beam toward said powder layer wherein said energy beam penetrates said powder layer to said penetration depth;

(e) sintering at least a portion of said powder layer at said penetration depth;

(f) forming a subsequent powder layer comprising said first powder and said second powder over said powder layer, said subsequent powder having a subsequent penetration depth;

(g) directing said energy beam toward said subsequent powder layer wherein said energy beam penetrates said subsequent powder layer to said subsequent penetration depth;

(h) sintering at least a portion of said subsequent powder layer; and (i) repeating steps (f) through (h) until part is attained.

9. The part of claim 8, wherein said penetration depth is substantially equivalent to said subsequent penetration depth.

* * * * *